US010566165B2

(12) United States Patent
Ono et al.

(10) Patent No.: US 10,566,165 B2
(45) Date of Patent: Feb. 18, 2020

(54) FUSE BOARD AND BATTERY BLOCK EQUIPPED WITH SAME

(75) Inventors: Masahiro Ono, Osaka (JP); Takashi Nakagawa, Osaka (JP); Akira Takano, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1258 days.

(21) Appl. No.: 13/880,282

(22) PCT Filed: May 25, 2012

(86) PCT No.: PCT/JP2012/003412
§ 371 (c)(1),
(2), (4) Date: Apr. 18, 2013

(87) PCT Pub. No.: WO2012/164884
PCT Pub. Date: Dec. 6, 2012

(65) Prior Publication Data
US 2013/0202941 A1    Aug. 8, 2013

(30) Foreign Application Priority Data

May 31, 2011 (JP) ................. 2011-121643
Aug. 23, 2011 (JP) ................. 2011-181891

(51) Int. Cl.
*H01H 85/00* (2006.01)
*H01H 69/02* (2006.01)
(Continued)

(52) U.S. Cl.
CPC ............ *H01H 85/00* (2013.01); *H01H 69/02* (2013.01); *H01H 85/0241* (2013.01);
(Continued)

(58) Field of Classification Search
None
See application file for complete search history.

(56) References Cited

U.S. PATENT DOCUMENTS

| 5,204,194 A   | 4/1993 | Miller et al. |
| 5,299,955 A * | 4/1994 | Maeda ................ H01M 2/1066 361/532 |

(Continued)

FOREIGN PATENT DOCUMENTS

| CN | 102272980 A | 12/2011 |
| DE | 3040884 A1  | 5/1982  |

(Continued)

OTHER PUBLICATIONS

International Search Report for PCT/JP2012/003412 dated Aug. 21, 2012.

(Continued)

*Primary Examiner* — Ula C Ruddock
*Assistant Examiner* — Anna Korovina
(74) *Attorney, Agent, or Firm* — Pearne & Gordon LLP

(57) ABSTRACT

A fuse board including a metal plate, a connection portion connected to a cell, a fuse portion connecting the metal plate to the connection portion, and an insulating resin film bonded to the fuse portion, wherein a wiring pattern of the fuse portion has a bent portion, and the insulating resin film has a rectangular sheet-like shape that covers one surface of the fuse portion.

8 Claims, 4 Drawing Sheets

(51) Int. Cl.
    *H01H 85/12*     (2006.01)
    *H01H 85/02*     (2006.01)
    *H01M 2/30*     (2006.01)
    *H01M 10/42*     (2006.01)
    *H01M 2/34*     (2006.01)
    *H01H 85/20*     (2006.01)
    *H01H 85/143*     (2006.01)

(52) U.S. Cl.
    CPC .............. *H01H 85/12* (2013.01); *H01M 2/30* (2013.01); *H01M 2/34* (2013.01); *H01M 10/425* (2013.01); *H01M 10/4207* (2013.01); *H01H 85/143* (2013.01); *H01H 85/205* (2013.01); *H01M 2200/103* (2013.01); *Y10T 29/49107* (2015.01)

(56) References Cited

U.S. PATENT DOCUMENTS

| | | | |
|---|---|---|---|
| 5,644,282 A * | 7/1997 | Mehta | H01H 85/046 337/290 |
| 5,805,423 A * | 9/1998 | Wever | H05K 3/325 361/760 |
| 6,342,826 B1 * | 1/2002 | Quinn | H01H 35/343 337/13 |
| 7,671,565 B2 | 3/2010 | Straubel | |
| 2001/0002812 A1 | 6/2001 | Sumida et al. | |
| 2003/0075352 A1 | 4/2003 | Sumida et al. | |
| 2004/0089928 A1 * | 5/2004 | Nakajima | H01L 21/565 257/678 |
| 2004/0161612 A1 * | 8/2004 | Takanezawa | H05K 3/4676 428/414 |
| 2005/0275370 A1 | 12/2005 | Kim | |
| 2007/0173109 A1 * | 7/2007 | Chang | H01M 2/1038 439/500 |
| 2007/0188147 A1 | 8/2007 | Straubel et al. | |
| 2008/0070067 A1 | 3/2008 | Jang et al. | |
| 2008/0241667 A1 * | 10/2008 | Kohn | H01M 2/1016 429/159 |
| 2010/0015519 A1 * | 1/2010 | Trester | H01M 10/48 429/160 |
| 2010/0196753 A1 * | 8/2010 | Heo | H01M 2/202 429/158 |
| 2010/0291426 A1 | 11/2010 | Zhou | |
| 2011/0104958 A1 * | 5/2011 | Kwon | H01M 2/105 439/816 |
| 2011/0177365 A1 * | 7/2011 | Yasui | H01M 2/105 429/61 |
| 2011/0223776 A1 * | 9/2011 | Ferber, Jr. | H05K 3/325 439/39 |
| 2015/0364744 A1 * | 12/2015 | Takano | H01M 2/34 429/61 |

FOREIGN PATENT DOCUMENTS

| | | |
|---|---|---|
| JP | 55-137505 U | 9/1980 |
| JP | 02-089753 U | 7/1990 |
| JP | 07-254347 A | 10/1995 |
| JP | 2001-160347 A | 6/2001 |
| JP | 2005-347251 A | 12/2005 |
| WO | 2011/007535 A1 | 1/2011 |
| WO | WO-2011007535 A1 * | 1/2011 ............ H01M 2/105 |

OTHER PUBLICATIONS

European Search Report for Application No. EP 12 79 2387 dated Jul. 14, 2014.

* cited by examiner

FUSE BOARD AND BATTERY BLOCK EQUIPPED WITH SAME

TECHNICAL FIELD

The present invention relates to a fuse board and a battery block having the fuse board.

BACKGROUND ART

A battery block having desired voltage or current capacity is obtained by combining plural cells. In the battery block, electrode terminals of the plural cells are connected to a single electrode plate. Therefore, when overcurrent flows in a cell, the battery block itself may be short-circuited. Therefore, a fuse for disconnecting the electrode plate and the corresponding cell may be provided to prevent a short circuit.

When a fuse is disposed between the corresponding cell and the electrode plate, a technique of forming the fuse by performing a bracket welding process between an electrode terminal of a cell and an electrode plate or forming the fuse by wire-bonding has been proposed (see PTL 1).

PTL 2 discloses a fuse manufacturing method including (A) a step of forming an input terminal portion and plural output terminal portions by press-punching a conductive metal plate, (B) a step of previously molding an area of the punched metal plate, which includes a position where a fuse portion is formed, with an insulator, and (C) a step of forming the fuse portion having a substantially S shape through the use of a punching process. However, there is a problem in that the manufacturing process is complicated and bonding strength between the fuse and the cell is weak.

Various relevant techniques have been disclosed (for example, PTLs 3 to 7), but the above-mentioned problem has not been solved.

CITATION LIST

Patent Literature

PTL 1
U.S. Pat. No. 7,671,565
PTL 2
Japanese Patent Application Laid-Open No. 2001-160347
PTL 3
Japanese Patent Application Laid-Open No. 2005-347251
PTL 4
International Publication No. WO2011/007535
PTL 5
U.S. Patent Application Laid-Open No. 2003-0075352
PTL 6
U.S. Patent Application Laid-Open No. 2005-0275370
PTL 7
U.S. Patent Application Laid-Open No. 2007-0188147

SUMMARY OF INVENTION

Technical Problem

As described above, in the battery block including plural cells, a fuse is provided to each cell so as to prevent a short circuit of the battery block. However, the wire-bonding process is complicated and troublesome. On the other hand, when a fuse is intended to bond to an electrode terminal by welding, a wire of a fuse may be cut due to vibration in the welding process. When the battery block is actually being used, the wires of the fuses may be cut due to vibration.

Particularly, when a fuse board formed by punching and bending a metal plate is welded to cells, wires of fuses are relatively bulky and thus can easily vibrate and be easily cut. Therefore, an object of the present invention is to prevent cutting of a fuse wire due to vibration by optimizing a wiring pattern of a fuse and forming a resin film for protecting the fuse.

Solution to Problem

A first embodiment of the present invention is a fuse board to be described below.

(1) A fuse board including a metal plate, a connection portion connected to a cell, a fuse portion connecting the metal plate to the connection portion, and an insulating resin film bonded to the fuse portion, wherein a wiring pattern of the fuse portion has bent portion, and the insulating resin film has a rectangular sheet-like shape that covers one surface of the fuse portion.

(2) The fuse board according to (1), wherein the metal plate includes a suspension portion that is able to vibrate, and the fuse portion is connected to the suspension portion.

(3) The fuse board according to (1), wherein the fuse board is obtained by punching and bending the metal plate to pattern the connection portion and the fuse portion.

(4) The fuse board according to (1), wherein the height of the metal plate is different from the height of the connection portion.

(5) The fuse board according to (1), wherein the wiring pattern of the fuse portion has two or more bent portions, and the two or more bent portions are located on the opposite sides about a straight line connecting both ends of the fuse portion.

(6) The fuse board according to (1), wherein the thickness of the fuse portion is smaller than the thickness of the metal plate.

(7) The fuse board according to (1), wherein the insulating resin film includes an insulating resin and an inorganic filler.

(8) The fuse board according to (1), wherein the fuse board includes one metal plate, a plurality of connection portions, a plurality of fuse portions, and a plurality of insulating resin films.

A second embodiment of the present invention is a fuse board manufacturing method to be described below.

(9) A method of manufacturing the fuse board according to (1), including: preparing a metal plate; forming a connection portion and a fuse portion by punching the metal plate; adjusting the position of the connection portion by bending the metal plate; and covering the connection portion with an insulating resin film.

A third embodiment of the present invention is a battery block to be described below.

(10) A battery block including a plurality of cells having two or more electrode terminals and a fuse board connected to one electrode terminal of each of the plurality of cells, wherein the fuse board includes a metal plate, connection portions welded to one electrode terminal of each of the plurality of cells, fuse portions connecting the metal plate to the connection portions, and insulating resin films bonded to the fuse portions, and a wiring pattern of the fuse portion has a bent portion.

A fourth embodiment of the present invention is a fuse board to be described below.

(11) A fuse board including: a metal plate in which a plurality of openings extending from the top surface to the bottom surface are formed; a suspension portion that includes a first rod-like portion and a second rod-like portion extending from two points on the edge of each opening, respectively, and a body portion continuously extending from ends of the first rod-like portion and the second rod-like portion and that is formed in a substantial U-shape to be able to vibrate; a fuse portion that is formed from the body portion of the suspension portion to a joint to the metal plate to continuously extend from the suspension portion and that includes a bent wiring pattern; a connection portion that is formed continuously from the fuse portion and that is able to be connected to a corresponding cell; and an insulating resin film that has a rectangular sheet-like shape extending from a part of the body portion of the suspension portion to a part of the connection portion to cover one surface of the fuse portion.

(12) The fuse board according to (11), wherein the top surface of the connection portion is disposed lower than the bottom surface of the metal plate.

Advantageous Effects of Invention

The fuse board according to the present invention can be simply and easily manufactured by punching and bending a metal plate. In the fuse board according to the present invention, the wire of the fuse portion is not easily cut even due to vibration or the like. Therefore, it is possible to prevent a fuse member from being cut due to vibration even in a welding process of bonding the fuse board to the battery or in the use of the battery.

By disposing plural connection portions and fuse portions in the fuse board according to the present invention, a battery block in which a fuse function is given to each cell is provided as a battery block having plural cells. Therefore, even when a problem is caused in some cells, it is possible to prevent a short circuit of the battery block as a whole.

DESCRIPTION OF EMBODIMENTS

Figure 1:
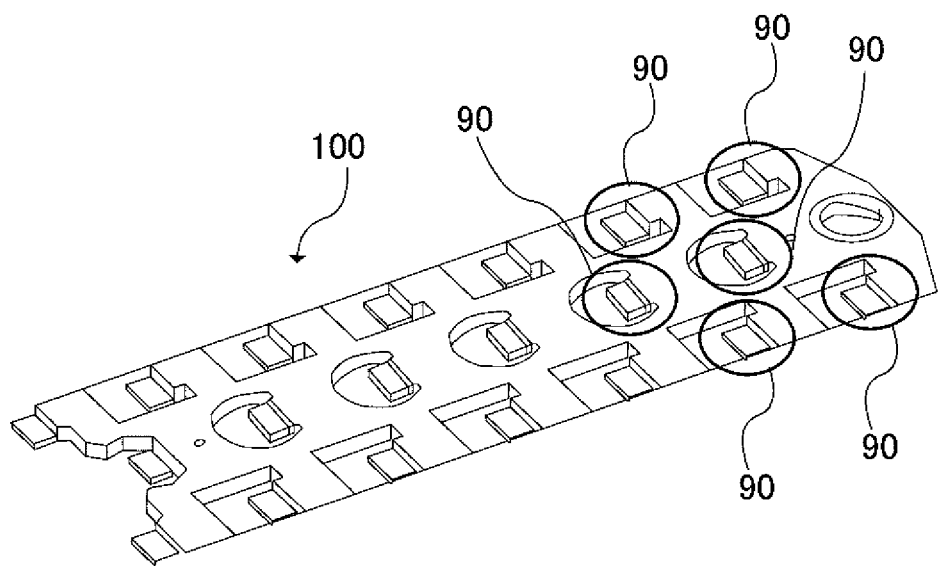
FIG. 1 is a top perspective view of a fuse board according to an embodiment.

Hereinafter, the invention will be described with reference to an embodiment, but the invention is not limited to the invention. In the accompanying drawings, elements having equal or similar functions will be referenced by equal or similar reference numerals and description thereof will not be repeated. The drawings are schematic. Therefore, specific dimensions should be determined in comparison with the following description. The elements in the drawings may have different dimensional relationships or ratios.

(Fuse Board)

A fuse board according to the present invention includes a metal plate, a connection portion connected to a cell, a fuse portion, and an insulating resin film. Preferably, the fuse board according to the present invention includes two or more connection portions, fuse portions, and insulating resin films for each metal plate. The fuse board including the two or more connection portions, fuse portions, and insulating resin films can be used as a fuse board of a battery block including plural cells.

Figure 2A:
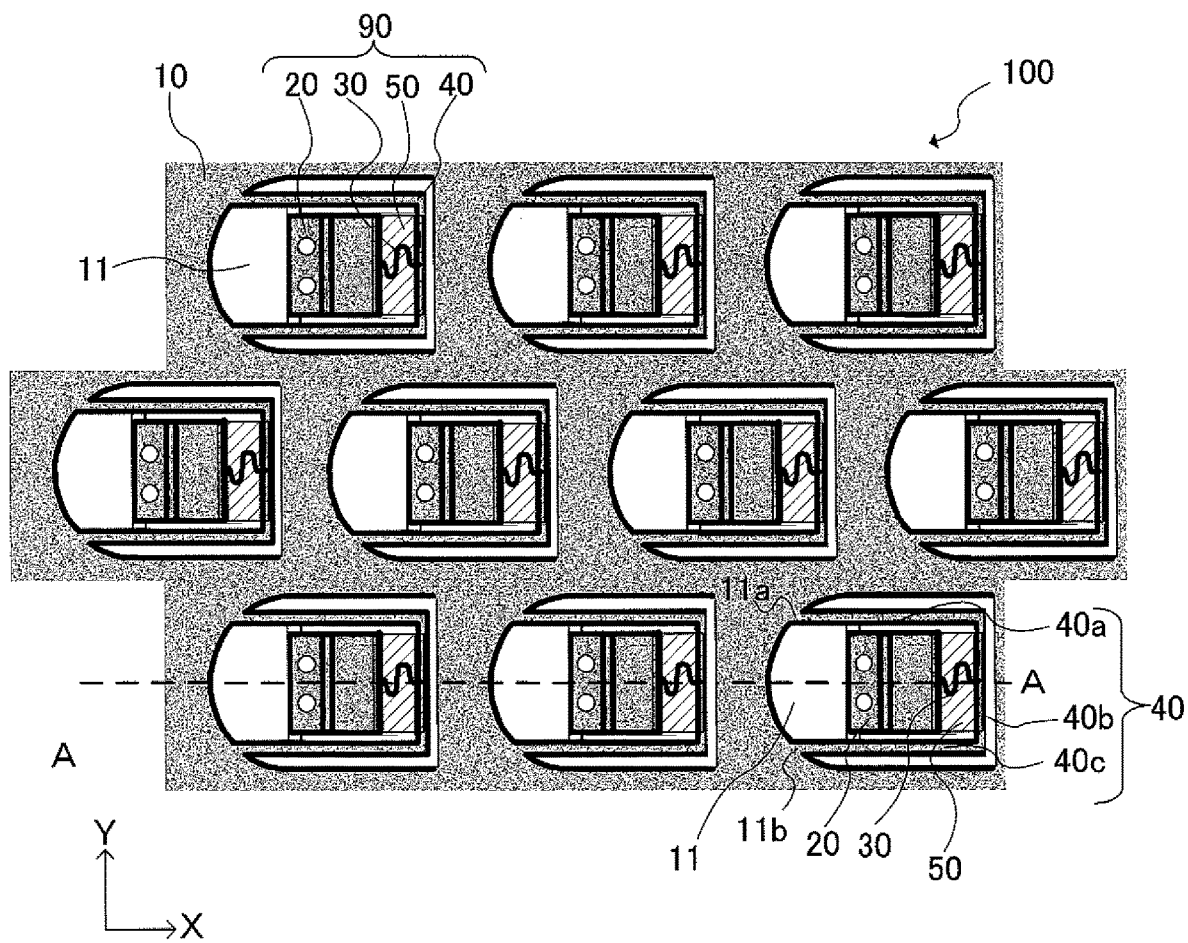
FIG. 2A is a top view of the fuse board according to the embodiment.
Figure 2B:
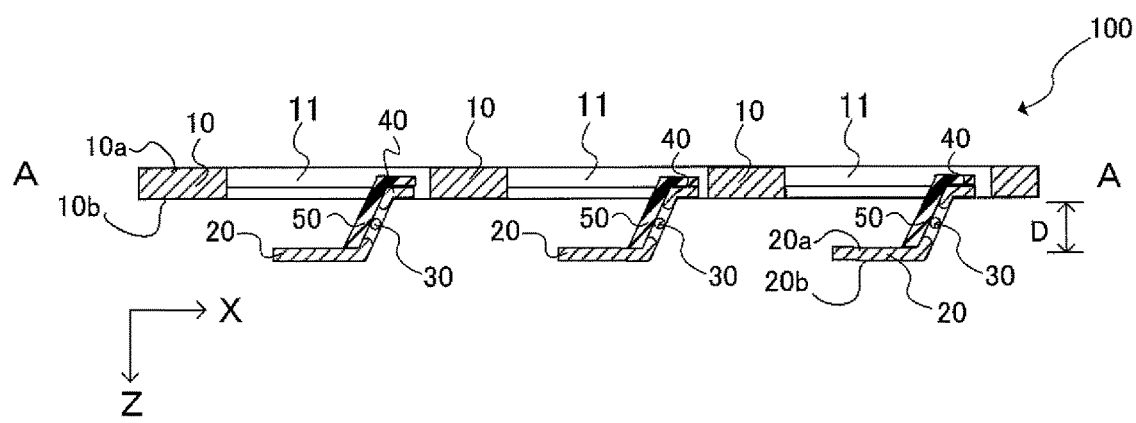
FIG. 2B is a cross-sectional view of the fuse board according to the embodiment.

FIG. 1 is a top perspective view of fuse board 100 according to an embodiment of the present invention. FIG. 2A is a top view of fuse board 100. FIG. 2B is a cross-sectional view of fuse board 100.

Fuse board 100 includes (A) metal plate 10 in which plural openings 11 extending from top surface 10a to bottom surface 10b are formed, (B) substantially U-shaped suspension portion 40 that includes first rod-like portion 40a and second rod-like portion 40c extending from two points 11a and 11b on the edge of opening 11, respectively, and body portion 40b that is formed to continuously extend from ends of first rod-like portion 40a and second rod-like portion 40c and that is able to vibrate, (C) fuse portion 30 that includes a bent wiring pattern formed from body portion 40b of suspension portion 40 to joints 11a and 11b to metal plate 10 to continuously extend from suspension portion 40, (D) connection portion 20 that is formed to continuously extend from fuse portion 30 and that is able to be connected to a cell, and (E) insulating resin film 50 that extends from a part of body portion 40b of suspension portion 40 to a part of connection portion 20 to cover one surface of fuse portion 30 and that has a rectangular sheet shape.

It is preferable that top surface 20a of connection portion 20 be disposed lower by a distance D from bottom surface 10b of metal plate 10. Since suspension portion 30 is able to vibrate in the gravitational direction (in the Z direction in the drawing), a stress due to vibration in use can be absorbed. In this way, by providing suspension portion 40 having a three-dimensional shape, it is possible to keep reliability of connection to a cell high according to fuse board 100.

Fuse portion 30 is protected by insulating resin film 50, and thus is not easily cut even with a stress due to vibration.

In fuse board 100, opening 11, suspension portion 40, fuse portion 30, and connection portion 20 are patterned by punching and bending a metal plate. That is, since fuse board 10 can be formed as a unified body out of a metal plate, it is possible to simply and easily manufacture the fuse board.

On the other hand, the fuse disclosed in PTL 2 has a planar shape obtained by press-punching a metal plate. The fuse disclosed in PTL 2 and the like does not include three-dimensional suspension portion 40. Accordingly, the fuse disclosed in PTL 2 and the like cannot absorb the entire stress due to vibration in use and it is thus difficult to keep the reliability of connection to a cell high.

A metal plate of the fuse board is preferably a plate formed of metal. Examples of the metal include aluminum, stainless steel, copper, and brass, and aluminum can be preferably used. The thickness of the metal plate is not particularly limited, and may be in the range of about 0.15 to 3 mm. Within this range, mechanical strength as a member can be obtained.

The connection portion of the fuse board is a metal member connected to an electrode terminal of a cell. Although not particularly limited, the connection portion is welded to the electrode terminal. It is preferable that metal forming the connection portion be the same as the metal plate. The thickness of the connection portion is not particularly limited, and may be in the range of 0.1 to 0.4 mm and preferably in the range of 0.2 to 0.25 mm. When the thickness is excessively large, it may be difficult to weld the connection portion to the electrode terminal of a cell.

It is preferable that the connection portion be located at a height position different from the height of the metal plate. This is because the connection portion can be simply connected to the electrode terminal of a cell.

The fuse portion is a fine metal wire and the line width thereof may be in the range of 0.1 to 0.4 mm. The thickness of the metal wire of the fuse portion is in the range of 0.1 to 0.4 mm and preferably in the range of 0.2 to 0.25 mm. It is preferable that the metal of the metal wire of the fuse portion be the same as the metal plate. When the line width of the metal wire of the fuse portion is excessively large or the thickness thereof is excessively large, it is not possible to obtain a fuse function (a function of cutting the metal wire when overcurrent flows).

Figure 3A:
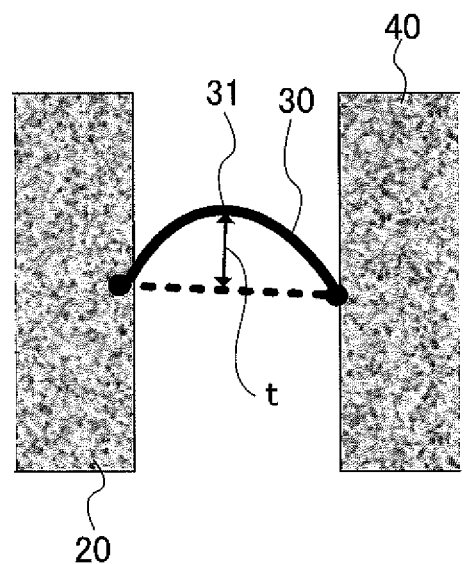
FIG. 3A is a diagram illustrating a fuse pattern of the fuse board according to the embodiment (one example thereof)
Figure 3B:
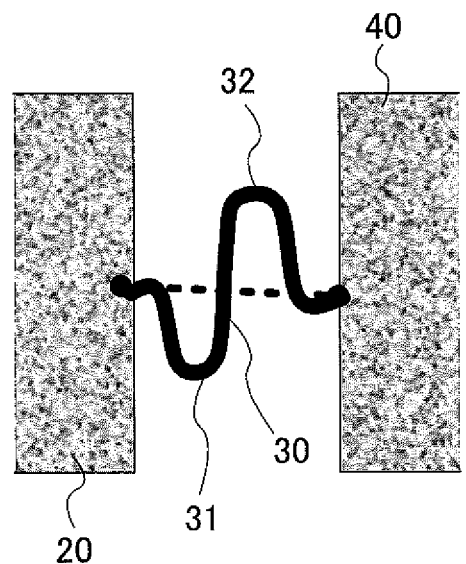
FIG. 3B is a diagram illustrating a fuse pattern of the fuse board according to the embodiment (another example thereof)

The metal wiring pattern of the fuse portion has a bent portion and preferably has so-called "flexure" (see FIGS. 3A and 3B). Accordingly, the stress on the fuse portion is reduced and thus the fuse portion is not easily cut. The metal wiring pattern of the fuse portion has only to have a bent portion, and the degree of flexure t (see FIG. 3A) is preferably larger than the line width of the fuse pattern. It is preferable that the fuse pattern of the fuse portion have two or more bent portions (see FIG. 3B). It is preferable that the two bent portions be located on the opposite sides about a straight line (a straight line connecting a connecting position to the connection portion and a connecting position to the metal plate) connecting both ends of the fuse portion. By employing such a fuse pattern, it is possible to alleviate the stress even when the stress is applied in any direction.

The insulating resin film is a protective film protecting the fuse portion. As described above, since the fuse portion is a fine metal wire, the fuse portion can be easily cut due to vibration. Therefore, by attaching the insulating resin film to the fuse portion, it is preferable to prevent the cutting of the fuse portion. It is preferable that the insulating resin film be disposed to cover at least one surface of the fuse portion. From the viewpoint of improvement in workability or reliability of connection to a cell, it is preferable that the insulating resin film having a rectangular sheet shape extending from a part of the body portion of the suspension portion to a part of the connection portion be disposed to cover one surface of the fuse portion. This is because it is possible to achieve improvement in reliability of connection to a cell. Since only one positioning operation in the press-punching process on the metal plate is required, it is possible to simplify the manufacturing process.

On the other hand, as disclosed in PTL 2, when the punching process is performed so that the shape of the insulating resin film is matched with the shape of the fuse portion, it is difficult to effectively prevent the cutting of the fuse portion. In PTL 2, a process of forming an insulator in an area including the portion in which the fuse is formed is performed before the punching process on the metal plate. Accordingly, it is necessary to position punched portions for each process and thus the manufacturing process is complicated.

It is preferable that the insulating resin film include a resin component such as polyimide, an epoxy-based resin, and an acryl-based resin and an insulating inorganic filler. An example of the inorganic filler is a glass filler. The thickness of the insulating resin film is not particularly limited, and may be in the range of 50 μm to 500 μm.

As described above, it is preferable that the fuse board include a suspension portion being able to vibrate. Since the suspension portion connects the metal plate and the fuse portion, the vibration of the fuse board is absorbed by the suspension portion and the stress due to vibration is not easily applied to the fuse portion. Specifically, the suspension portion is, for example, a U-shaped member and both ends are supported by the metal plate. The fuse portion is connected to the central portion of the U shape.

The volume of the metal forming the suspension portion is larger than the volume of the metal forming the fuse portion. Accordingly, the suspension portion absorbs the vibration of the fuse board to suppress application of a stress to the fuse portion.

(Method of Manufacturing Fuse Board)

The fuse board according to the present invention can be manufactured by punching and bending a base metal plate. Specifically, by punching the base metal plate, the connection portions, the fuse portions, and the suspension portions constituting the fuse board are formed. As a result, the base metal plate becomes a metal plate constituting the fuse board. The metal of the connection portions, the fuse portions, and the suspension portions is the same metal as the metal plate constituting the fuse board.

It is preferable that portions of the metal plate which become the connection portions, the fuse portions, and the suspension portions be compressed to reduce the thickness before performing the punching process. After the compression, members corresponding to the connection portions and the fuse portions are punched to form shapes.

The connection portions are subjected to a bending process so as to easily connect the connection portions to cells. Specifically, the height of the metal plate and the height of the connection portions are made to be different from each other. By bending the connection portions in a predetermined shape and then attaching the insulating resin films to the fuse portions, a fuse board is obtained.

(Battery Block)

The battery block according to the present invention includes the fuse board according to the embodiment of the present invention and plural cells. Each of the plural cells has a pair of electrode terminals. The connection portion of the fuse board is connected to one electrode terminal of each of the plural cells. This connection can be performed by welding.

The battery block may include plural cells and a member housing the plural cells. The member housing the cells is not particularly limited, but may be a member which is obtained by unifying plural pipe-like members and which can house the cells in the respective pipe-like members.

The present invention will be described below with reference to the accompanying drawings. FIG. 1 is a top perspective view of fuse board 100 according to an embodiment. Fuse board 100 includes metal plate 10 and twenty fuse function portions 90. Each fuse function portion 90 includes connection portion 20, fuse portion 30, suspension portion 40, and insulating resin film 50 (see FIGS. 2A and 2B).

FIG. 2A is a top view of fuse board 100 according to the embodiment. As illustrated in FIG. 2A, connection portion 20, fuse portion 30, insulating resin film 50, and suspension portion 40 are formed in metal plate 10. Suspension portion 40 has a U shape, and both ends of the U shape are fixed to and supported by metal plate 10. One end of fuse portion 30 is connected to the central portion of the U shape. The other end of fuse portion 30 is connected to connection portion 20.

FIG. 2B is a cross-sectional view taken along line X-X of fuse board 100. As illustrated in FIG. 2B, the thickness of connection portion 20, fuse portion 30, and suspension portion 40 is smaller than the thickness of metal plate 10. By reducing the thickness of the connection portion, the welding thereof to the electrode terminal of the corresponding cell is facilitated. By reducing the thickness of fuse portion 30, a fuse function is obtained. As illustrated in FIG. 2B, the height of metal plate 10 is different from the height of connection portion 20. By causing the heights to be different from each other, it is easy to connect connection portion 20 to the electrode terminal of the corresponding cell (see FIG. 4).

When fuse board 100 vibrates, U-shaped suspension portion 40 absorbs the vibration. Accordingly, a stress due to the vibration is hardly applied to fuse portion 30 connected to suspension portion 40. Since fuse portion 30 is protected by insulating resin film 50, the fuse portion is not easily cut even with a stress due to vibration applied thereto.

FIGS. 3A and 3B illustrate examples of the metal wiring pattern of fuse portion 30 of fuse board 100. The wiring pattern of fuse portion 30 illustrated in FIG. 3A has bent portion 31. By providing bent portion 31, the metal wire of fuse portion 30 has a flexure and a stress is hardly applied to the metal wire. The degree of flexure t has only to be larger than the width of the wire.

Fuse portion 30 illustrated in FIG. 3B has first bent portion 31 and second bent portion 32. By providing two bent portions, flexures are formed in the metal wire of fuse portion 30 and thus the stress load due to vibration is more easily alleviated. Particularly, as illustrated in FIG. 3B, when first bent portion 31 and second bent portion 32 are located on the opposite side about a straight line connecting a joint of fuse portion 30 to connection portion 20 and a joint to suspension portion 40, it is easier to alleviate the stress.

Figure 4A:
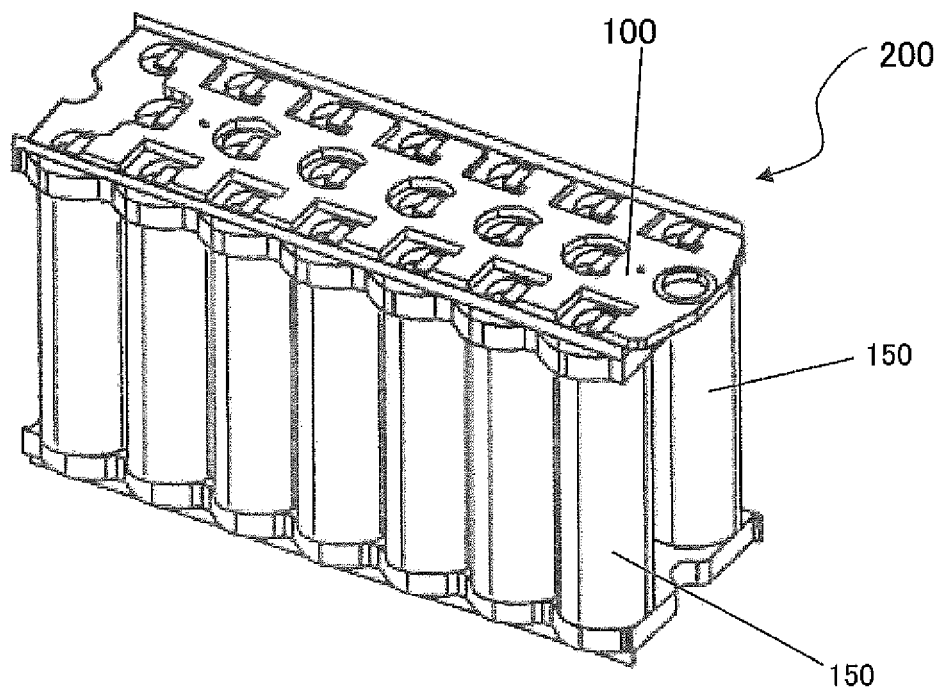
FIG. 4A is a top perspective view of a battery block including the fuse board according to the embodiment.

FIG. 4A illustrates battery block 200 including one fuse board 100. Battery block 200 includes twenty cells 150 in total. One electrode of each cell 150 is connected to fuse board 100.

Figure 4B:
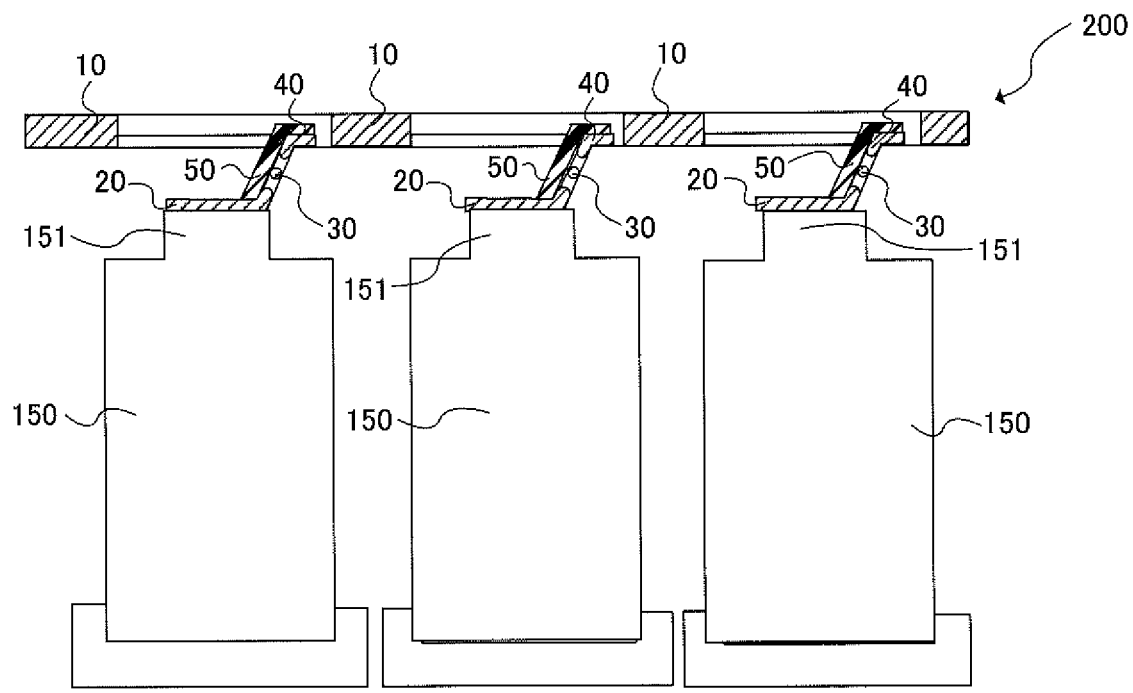
FIG. 4B is a cross-sectional view of the battery block including the fuse board according to the embodiment.

FIG. 4B illustrates a cross-section of connection portions between fuse board 100 and cells 150 in battery block 200. As illustrated in FIG. 4B, electrode terminals 151 of cells 150 are connected to connection portions 20 of fuse board 100. This connection may be performed by welding. Vibration may occur during the welding, but a stress is hardly applied to fuse portions 30 of fuse board 100 and thus the wires of the fuse portions are not cut.

When a problem occurs in cell 150 and overcurrent flows in battery block 200, the wires of several fuse portions 30 of fuse board 100 are cut. Therefore, battery block 200 does not cause a short circuit.

The disclosures of Japanese Patent Applications previously filed by the applicant of the present invention, that is, Japanese Patent Application No. 2011-121643 (filed on May 31, 2011) and Japanese Patent Application No. 2011-181891 (filed on Aug. 23, 2011), including the specification, drawings and abstract, are incorporated herein by reference in their entirety.

INDUSTRIAL APPLICABILITY

The fuse board according to the present invention can be obtained simply and inexpensively by punching and bending a metal plate. The cutting of the fine metal wire of the fuse portion is suppressed. Accordingly, the fuse board can be used as a fuse board of a battery or a battery block including plural cells. The cells and the fuse board can be bonded to each other even by welding in which vibration easily occurs.

The battery block including the fuse board according to the present invention hardly causes fuse cutting due to vibration. Therefore, the battery block according to the present invention can be suitably used in environments where vibration easily occurs, such as secondary batteries for vehicles.

REFERENCE SIGNS LIST

10 Metal Plate
11 Opening
20 Connection portion
30 Fuse portion
31 First bent portion
32 Second bent portion
40 Suspension portion
50 Insulating resin film
90 Fuse function portion
100 Fuse board
150 Cell
151 Electrode terminal
200 Battery block

The invention claimed is:

1. A fuse board comprising
a metal plate that has one or more openings,
a connection portion connected to a cell at each of the one or more openings,
a suspension portion that includes a first rod-like portion and a second rod-like portion which extend from two points on an edge of each of the one or more openings of the metal plate, respectively, and a body portion which continuously extends from respective ends of the first rod-like portion and the second rod-like portion, wherein the suspension portion is formed together with the metal plate and formed in a substantial U-shape, and the body portion is opposed to a part, opposite to the two points, of the metal plate via a gap,
a fuse portion connecting the body portion of the suspension portion to the connection portion, and
an insulating resin film bonded to the fuse portion, wherein
the insulating resin film has a rectangular sheet-like shape that covers one surface of the fuse portion,
wherein the fuse portion comprises a first bent portion and a second bent portion, the first bent portion and the second bent portion being located on an opposite side about a straight line connecting a joint of the fuse portion to the connection portion and another joint of the fuse portion to the suspension portion, and
wherein the body portion of the suspension portion is connected to the metal plate only at the first rod-like portion and the second rod-like portion.

2. The fuse board according to claim 1, wherein the fuse board is obtained by punching and bending the metal plate to pattern the connection portion and the fuse portion.

3. The fuse board according to claim 1, wherein a height of the metal plate is different from a height of the connection portion.

4. The fuse board according to claim 1, wherein the wiring pattern of the fuse portion has two or more bent portions, and
wherein the two or more bent portions are located on opposite sides about a straight line connecting both ends of the fuse portion.

5. The fuse board according to claim 1, wherein a thickness of the fuse portion is smaller than a thickness of the metal plate.

6. The fuse board according to claim 1, wherein the insulating resin film includes an insulating resin and an inorganic filler.

7. A method of manufacturing the fuse board according to claim 1, comprising:
   preparing a metal plate;
   forming a connection portion and a fuse portion by punching the metal plate;
   adjusting the position of the connection portion by bending the metal plate; and
   covering the connection portion with an insulating resin film.

8. A battery block comprising a plurality of cells having two or more electrode terminals and the fuse board of claim 1 connected to one electrode terminal of each of the plurality of cells, wherein the fuse board includes the metal plate, connection portions welded to the one electrode terminal of each of the plurality of cells, fuse portions connecting the metal plate to the connection portions, and insulating resin films bonded to the fuse portions.

\* \* \* \* \*